United States Patent
Seo et al.

[11] Patent Number: 6,122,180
[45] Date of Patent: Sep. 19, 2000

[54] SMPS WITH CONSTANT POWER CONTROL CIRCUIT

[75] Inventors: Maeng-Ho Seo; Sang-Heum Yeon, both of Bucheon, Rep. of Korea

[73] Assignee: Fairfield Korea Semiconductor Ltd., Kyungki-do, Rep. of Korea

[21] Appl. No.: 09/465,086

[22] Filed: Dec. 16, 1999

[30] Foreign Application Priority Data

Dec. 18, 1998 [KR] Rep. of Korea ...................... 98-56009

[51] Int. Cl.[7] .................................................. H02M 3/335
[52] U.S. Cl. ............................................................ 363/21
[58] Field of Search ................................ 363/21, 95, 131

[56] References Cited

U.S. PATENT DOCUMENTS 5,633,787 5/1997 Song ............................................ 363/21
5,901,051 5/1999 Takahashi et al. ......................... 363/21

*Primary Examiner*—Shawn Riley
*Attorney, Agent, or Firm*—Marshall, O'Toole, Gerstein, Murray & Borun

[57] ABSTRACT

Disclosed is an SMPS with a constant power control circuit. The constant power control circuit comprises a current detector located in a secondary coil of a transformer and which detects a current flowing to the secondary coil; a current controller including a first comparator that compares a voltage corresponding to the current detected by the current detector with a predetermined first reference voltage; a load, which is electrically coupled to the secondary coil of the transformer, for receiving the power flowing to the secondary coil; a voltage controller detecting a voltage at the load, comparing the detected voltage with a second reference voltage, and outputting a difference between the voltages; a constant power controller receiving the current detected by the current detector, detecting the voltage of the secondary coil, comparing the detected voltage with the first reference voltage, and outputting a difference between the voltages; an amplifier receiving outputs of the voltage detector, the current detector, and the constant power detector, and amplifying the outputs to a predetermined gain value and outputting the result; and a switching controller receiving an output of the amplifier and determining the power of the secondary coil, and controlling the switching duty of the switching element depending on whether the determined power of the secondary coil is above or below the first reference voltage.

8 Claims, 3 Drawing Sheets

SMPS WITH CONSTANT POWER CONTROL CIRCUIT

BACKGROUND OF THE INVENTION (a) Field of the Invention

The present invention relates to a switching mode power supply (SMPS). More specifically, the present invention relates to an SMPS with a constant power control circuit for (a) controlling a current and voltage at a secondary coil of a transformer and (b) performing control to maintain a constant power at a predetermined interval such that a system employing the SMPS stably operates.

(b) Description of the Related Art

FIG. 1 is a schematic diagram of a conventional constant power control circuit. The conventional constant power control circuit comprises a rectifier 1, a constant power detector 11, a transformer 2, a switching unit 3 including an NMOS transistor, and a switching control unit 4 that is a pulse duration modulation controlling IC. The rectifier 1 comprises a capacitor C1 that smoothes the rectified voltage Vin. The constant power detector 11 comprises a resistor R1 having a terminal coupled to the capacitor C1 in parallel, and a resistor R2 coupled to the resistor R1 in series. The resistors R1 and R2 are coupled to a reference voltage terminal of the switching control unit 4.

The constant power detector 11 detects the voltage that flows to a primary coil through the rectifier 1 and provides the voltage to the switching control unit 4. In response to switching signals of the switching control unit 4, the switching unit 3 is turned on or off and provides to the switching control unit 4 the current that is detected when the switching unit 3 is turned on.

Therefore, the switching control unit 4 detects the current flowing at the primary coil using the voltage supplied from the constant power detector 11, and controls the level of the power that is supplied to the secondary coil using the current provided through the switching unit 3. That is, the switching control unit 4 uses the output voltage of the constant power detector 11 and the output current of the switching unit 3 so as to control the duty ratio of the switching signals that determines whether the switching unit 3 is controlled to an on or off state. Therefore, the switching control unit 4 ultimately controls the level of the power that is supplied to the secondary coil of the transformer 2.

Hence, the conventional art controls a maximum power, that is transferred from the primary coil to the secondary coil according to varied voltage of the primary coil, to maintain a constant value so that the maximum power supplied to the secondary coil is limited.

FIGS. 2 (a) and (b) show variations of the current and voltage of the conventional constant power control circuit of the SMPS. Referring to FIG. 2(a), a line ⓐ indicates the voltage of a battery, and a line ⓑ indicates the current provided to the battery. In an interval between A and B, a predetermined amount of the current is provided to the battery so that the voltage of the battery gradually increases, and in an interval between B and C, the current provided to the battery is controlled so that a rate of increase in the voltage of the battery is reduced. At this time, the power is controlled to maintain a constant value, and this power control is performed until the voltage of the battery reaches point C. In an interval between C and D, the voltage of the battery maintains a constant value, and the current is no longer provided to the battery.

Features shown in FIG. 2(a) are illustrated in a different format in FIG. 2(b) to explain the reason why power is controlled to maintain a constant value during a predetermined interval when charging a battery.

Referring to FIG. 2(b), in the interval between A and B, the current is provided to the battery by an amount equal to A so that the voltage of the battery reaches B. In the interval between B and C, the power is controlled to have a constant value. In the interval C and D, the voltage is maintained at a constant level and the current is reduced.

When the current having an amount equal to A continues to be provided to the battery, the voltage of the battery reaches point E. Since the voltage at point E is greater than the maximum power, the battery is damaged. Therefore, the power of the battery must be maintained at a constant value in the interval between B and C.

However, since the conventional art controls the power of the secondary coil according to the power of the primary coil, there occurs a reduction in the precision with which the power of the secondary coil is controlled. Accordingly, a power exceeding the maximum power can occur to damage the system. Furthermore, a voltage detector that comprises wattage resistors R1 and R2 detecting the voltage variations of the primary coil must be further installed to control the constant power.

SUMMARY OF THE INVENTION

It is an object of the present invention to provide an SMPS with a constant power control circuit which detects a current of a secondary coil and a voltage of a battery to control an output power, thereby enabling precise power control.

In one aspect of the present invention, in a switching mode power supply (SMPS) comprising a rectifier that rectifies alternating current (AC) power to direct current (DC) power, a transformer that induces the rectified power to a secondary coil through a primary coil to transform the power into the power required by the system, a switching element that is electrically coupled to the primary coil, and a pulse duration modulator that controls a switching operation of the switching element, a constant power control circuit comprises a current detector, located in the secondary coil of the transformer, detecting the current flowing to the secondary coil; a current controller including a first comparator that compares the voltage corresponding to the current detected by the current detector with a predetermined first reference voltage; a load, electrically coupled to the secondary coil of the transformer to receive the power flowing to the secondary coil; a voltage controller detecting the voltage at the load, comparing the detected voltage with a second reference voltage, and outputting a difference in voltage between the detected voltage and the second reference voltage; a constant power controller receiving the current controlled by the current controller and detecting the voltage of the secondary coil, comparing the detected voltage with the first reference voltage, and outputting a difference in voltage between the detected voltage and the first reference voltage; an amplifier receiving outputs of the voltage detector, the current detector, and the constant power detector, and amplifying the outputs to a predetermined gain value and outputting the result; and a switching controller receiving an output of the amplifier and determining the power of the secondary coil, and controlling the switching duty of the switching element depending on whether the determined power of the secondary coil is above or below the first reference voltage.

The constant power controller comprises (a) a multiplier having (i) a first input terminal coupled to an input terminal of a current detecting resistor and (ii) a second input terminal coupled to an output terminal of the current detector; and (b) a first amplifier having (i) a non-inverting terminal coupled to an output terminal of the multiplier and (ii) an inverting terminal receiving the first reference voltage.

The first reference voltage is a voltage of a maximum power that occurs in the secondary coil of the transformer.

The constant power controller outputs a value only when the voltage input through the non-inverting terminal is over the voltage input through the inverting terminal, that is, the first reference voltage.

The amplifier has a constant power control circuit characterized in a transconductance.

The load is a battery.

The voltage controller comprises an operational amplifier that receives the voltage of the load through a non-inverting input terminal and receives a third reference voltage through an inverting terminal, and outputs a signal of the difference between the two voltages.

The current controller comprises an operational amplifier that receives the output of the current detector through a non-inverting input terminal and receives the second reference voltage through an inverting terminal, and outputs a signal of the difference between the two voltages.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 3:
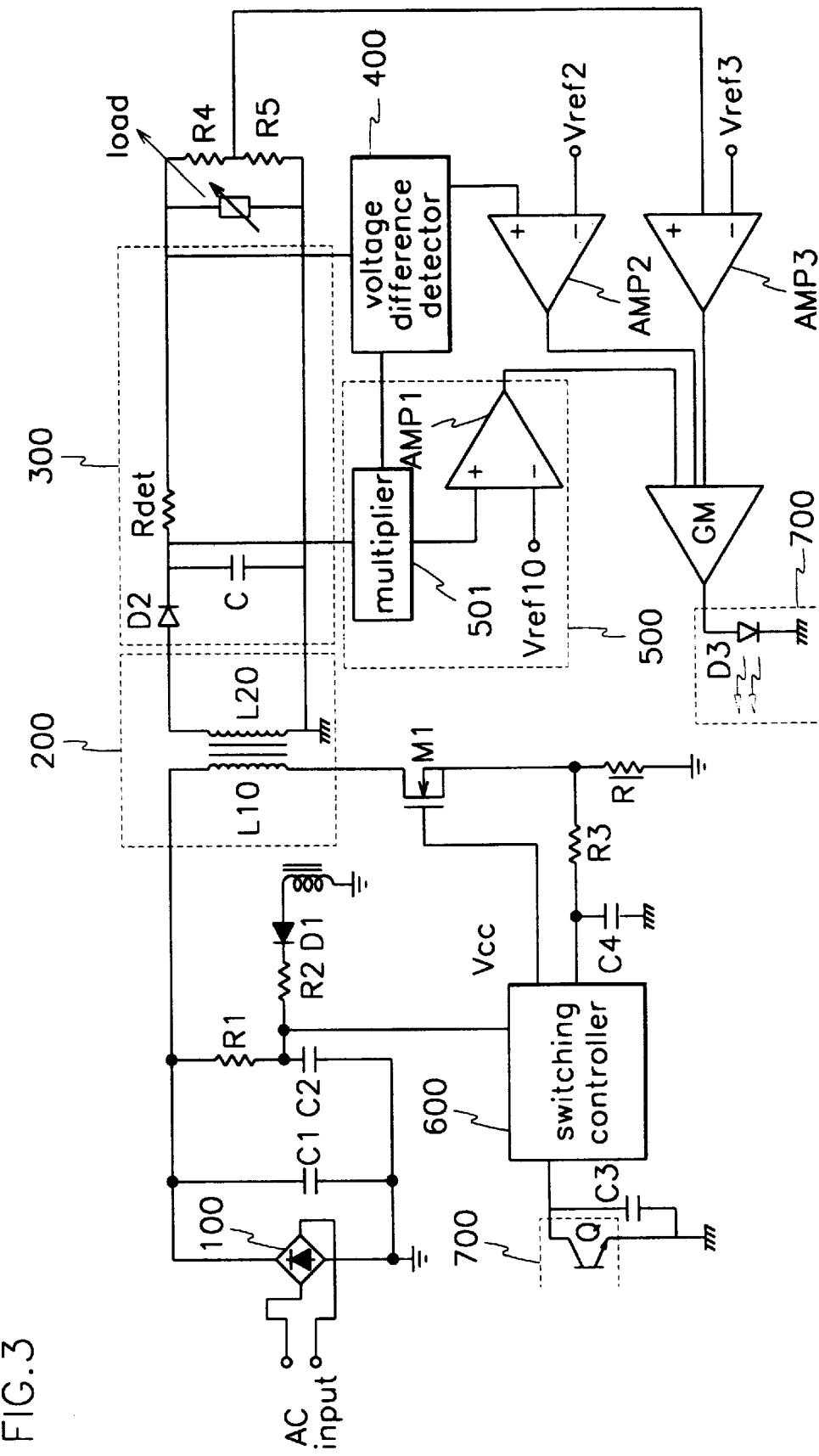
FIG. 3 is an SMPS with a constant power control circuit according to a preferred embodiment of the present invention.

FIG. 3 is an SMPS with a constant power control circuit according to a preferred embodiment of the present invention.

The constant power control circuit comprises a rectifier 100; a transformer 200 having a primary coil L10 and a secondary coil L20; an NMOS transistor M1; a battery (or a load); a direct current (DC) output terminal 300; a voltage difference detector 400; a constant power controller 500; a current amplifier AMP2; a voltage amplifier AMP3; a gain modifier GM; a switching controller 600; a current detecting resistor Rdet; resistors R1, R2, R3, R4, R5, and Rs; capacitors C1, C2, and C3; diodes D1 and D2; and a photo coupler 700. Here, the current detecting resistor Rdet and the voltage difference detector 400 are used for detecting a current.

The photo coupler 700 comprises a light emitting diode (LED) D3 having an anode coupled to an output terminal of the gain modifier GM, and a transistor Q having a collector coupled to a feedback input terminal of the switching controller 600, a grounded emitter, and a base to which light signals are supplied from the LED D3.

An input terminal of the rectifier 100 is connected to a power supply of 110/220 volts, and an output terminal of the rectifier 100 is coupled to the capacitor C1 and the resistor R1. One end of the capacitor C2 is coupled to the resistor R1 and the other end of the capacitor C2 is grounded. One end of the resistor R2 is coupled to the resistor R1 and the capacitor C2, and the other end of the resistor R2 is coupled to an anode of the diode D1. The diode D1 is coupled to a coil.

The primary coil L10 of the transformer 200 is coupled to an output terminal of the rectifier 100, and the voltage induced by the primary coil L10 is applied to the secondary coil L20.

The DC output terminal 300 comprises the diode D2, a capacitor C, and the current detecting resistor Rdet, and the voltage difference detector 400 is coupled to the current detecting resistor Rdet. The constant power controller 500, coupled to the diode D2 and current detecting resistor Rdet, comprises a multiplier 501 coupled to an output terminal of the voltage difference detector 400, and an amplifier AMP1 that receives an output of the multiplier 501 at a non-inverting terminal and receives a first reference voltage Vref1 at an inverting terminal.

The amplifier AMP2 receives the output of the voltage difference detector 400 at a non-inverting input terminal, and receives a second reference voltage Vref2 at an inverting terminal. The amplifier AMP3 receives the divided voltage by the resistors R1 and R2 (i.e., the voltage of the load) at a non-inverting input terminal, and receives a third reference voltage Vref3 at an inverting input terminal.

The gain modifier GM receives outputs of the amplifiers AMP1, AMP2, and AMP3. A drain of the NMOS transistor M1 is coupled to the primary coil L10, and a source of the NMOS transistor M1 is grounded. The switching controller 600 is coupled to the rectifier 100, coupled electrically to the output terminal of the gain modifier GM, and coupled to the source of the NMOS transistor M1.

Figure 1:
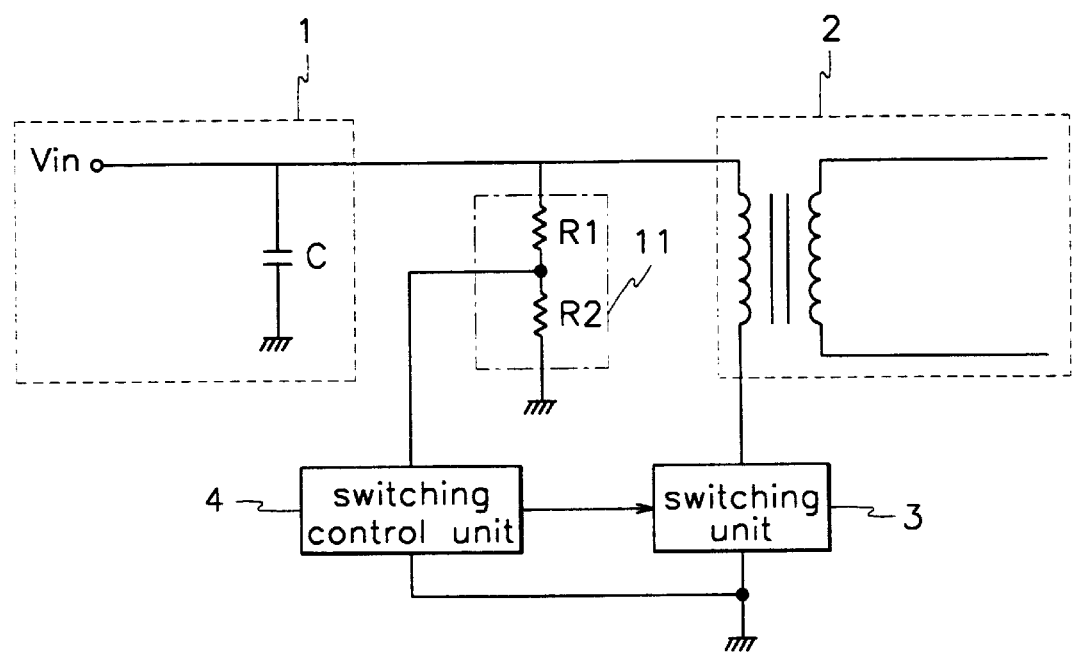
FIG. 1 is a schematic diagram of a conventional constant power control circuit.
Figure 2A:
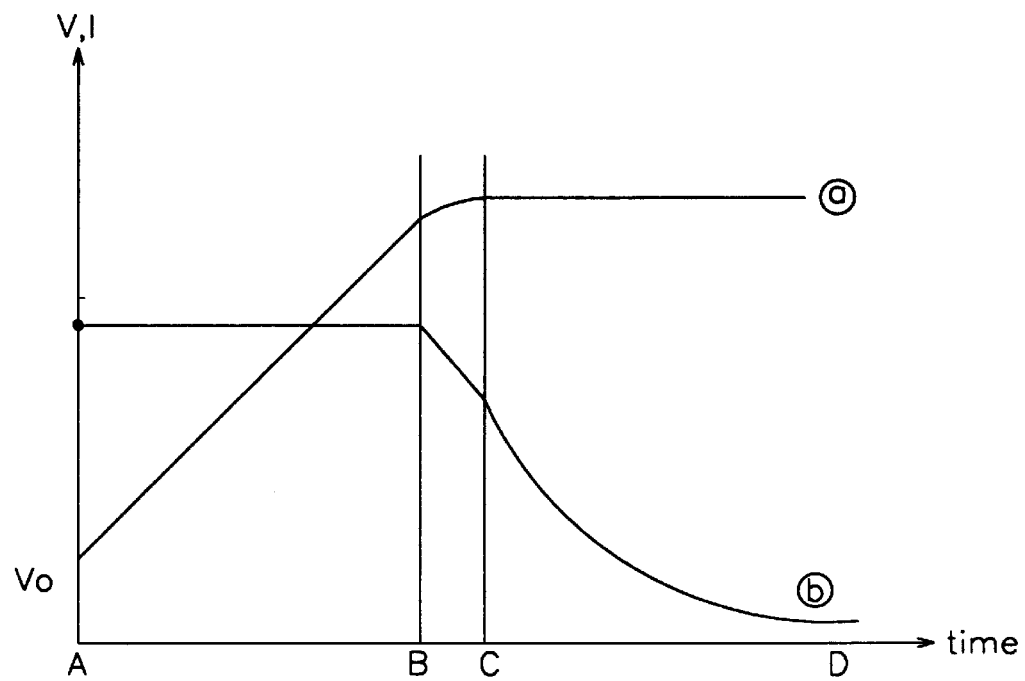
FIG. 2(a) shows characteristics of a current and a voltage of the conventional constant power control circuit with respect to time.
Figure 2B:
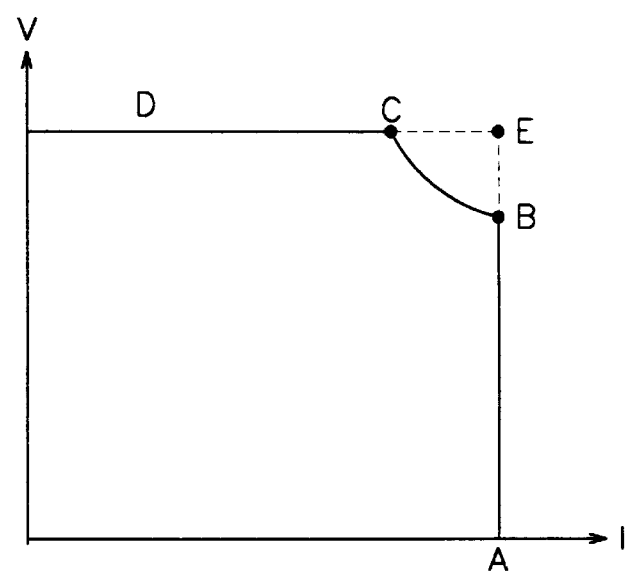
FIG. 2(b) shows characteristics of the current and voltage of the conventional constant power control circuit.

Referring to FIGS. 2(b) and 3, operation of the SMPS having a constant power control circuit according to the first preferred embodiment of the present invention will be described.

When alternating current (AC) power of 110/220 V is supplied, the rectifier 100 rectifies the AC power into DC power and outputs the DC power. The output power is smoothed by the capacitor C1 and flows to the primary coil L10 of the transformer 200. By such operation, the primary coil of the transformer 200 stores energy.

The power stored in the primary coil L10 is induced to the secondary coil L20 according to the winding ratio of the transformer 200, and the induced power is controlled to maintain a constant value according to switching operations of the NMOS transistor M1, the switching operations of the NMOS transistor M1 occurring depending on the switching duty. That is, when the NMOS transistor M1 is turned on to make the power induced to the primary coil L10 flow to the ground, the power induced to the secondary coil L20 becomes lower. The NMOS transistor M1 is turned off to store the energy in the primary coil L10 and therefore, the amount of the energy stored in the primary coil L10 is adjusted. Hence, when the on state of the NMOS transistor M1 lengthens, the amount of the current induced to the secondary coil L20 of the transformer 200 increases, and when the on state of the NMOS transistor M1 shortens, the amount of the current induced to the secondary coil L20 of the transformer 200 decreases.

On the other hand, the current induced to the secondary coil L20 of the transformer 200 is clamped by the diode D1 and smoothed by the capacitor C, and then provided to the battery (or the load) through the current detecting resistor Rdet. Here, the voltage at the current detecting resistor Rdet (i.e., the voltage at the capacitor C) is supplied to the multiplier 501 and the voltage difference detector 400, and the voltage at the other end of the current detecting resistor Rdet is supplied to the voltage difference detector 400. Hence, the voltage difference detector 400 detects the voltages at the ends of the current detecting resistor Rdet and computes the difference of the voltages, and the computed difference is divided by the resistance value of the current detecting resistor Rdet so as to find the current value provided to the battery. The voltage difference detector 400 supplies the current to the multiplier 501 of the constant power controller 500.

Operation of the constant power controller 500 will now be described.

The multiplier 501 receives the current detected by the voltage difference detector 400 and the voltage supplied from the current detecting resistor Rdet, multiplies the input current and voltage to compute the power, converts the power to the voltage, and outputs the voltage to a non-inverting terminal of the amplifier AMP1. At this time, the bigger the power from the multiplier, the greater the voltage supplied to the non-inverting terminal of the amplifier AMP1.

The amplifier AMP1 receives the output voltage of the multiplier 501 at the non-inverting terminal and compares the voltage with the first reference voltage Vref1 supplied through the inverting terminal. Here, the first reference voltage Vref1 is proportional to the maximum power supplied to the battery. That is, when the computed power is maximum, the first reference voltage Vref1 becomes identical with the voltage output from the multiplier 501. Hence, the amplifier AMP1 supplies to the gain modifier GM the voltage corresponding to the comparison result only when the non-inverting input is greater than the inverting input.

Here, the point at which the amplifier AMP1 supplies the voltage to the gain modifier GM corresponds to point B of FIGS. 2(a) and (b). The amplifier AMP1 outputs the signal to the gain modifier GM so that the output of the switching controller 600 according to the comparison result is supplied to a gate of the NMOS transistor M1, and accordingly, the amount of the current supplied to the battery is reduced in the interval B and C as shown in FIGS. 2(a) and (b). At this time, in the interval B and C, the voltage at the battery still increases and the product of the voltage and the current is constant.

On the other hand, since the input signal is weak, the gain modifier GM that receives the output signal of the amplifier AMP1 amplifies the input signal to a predetermined gain value and supplies the resulting input signal to the diode D3. The diode D3 then supplies light to the base of the photo transistor Q, which is turned on to provide the feedback current to the switching controller 600.

The switching controller 600, according to the current supplied from the gain modifier GM, increases a duty ratio of a signal presently performing switching operations of the NMOS transistor M1 so that a turn-on time of the NMOS transistor M1 is extended and the current induced to the secondary coil of the transformer 200 is reduced.

By the operation of the constant power controller 500 as described above, the power of the battery does not further increase at the maximum power. Namely, when viewed from the perspective of voltage, the voltage of the battery quickly increases until reaching the maximum power according to the operation of the constant power controller 500, and at the point where the power reaches the set maximum power, the supplied current reduces and the voltage gradually increases.

On the other hand, the current amplifier AMP2 controls the current supplied to the battery according to the current flowing to the secondary coil L20 of the transformer 200. The current amplifier AMP2 compares the output of the voltage difference detector 400 that is provided through a non-inverting terminal with the second reference voltage Vref2 that is provided through an inverting terminal, and outputs the voltage corresponding to the difference to the gain modifier GM. The gain modifier GM then amplifies the current of the voltage as much as a predetermined gain and outputs the resulting voltage to the switching controller 600. Accordingly, the switching controller 600 controls the switching duty of the NMOS transistor M1 to control the current supplied to the secondary coil.

The voltage amplifier AMP3 detects the voltage of the battery so that the current supplied to the secondary coil is controlled according to the voltage of the battery. Therefore, the voltage amplifier AMP3 compares the battery voltage with the third reference voltage Vref3 and outputs voltage corresponding to the difference to the gain modifier GM so that the switching controller 600 varies the switching duty according to the output voltage of the voltage amplifier AMP3. Here, the reference voltages Vref1, Vref2, and Vref3 respectively of the amplifiers AMP1, AMP2, and AMP3 are different, and are determined at the time of design.

The gain modifier GM separately operates for each output of the amplifiers AMP1, AMP2, AMP3. That is, the gain modifier GM separately operates for the input voltage comparison signal, the current comparison signal, and the power comparison signal, and adjusts the amplification gain values.

As described above, the present invention detects the current, voltage, and power flowing to the secondary coil of the transformer, and controls the switching operation of the NMOS transistor so that the battery is quickly charged and the constant power control is accurately performed. Also, the number of required components is reduced such that overall manufacturing costs of system are reduced.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a switching mode power supply (SMPS) comprising a rectifier that rectifies alternating current (AC) power to direct current (DC) power, a transformer that induces the rectified power to a secondary coil through a primary coil to transform the power into the power required by the system, a switching element that is electrically coupled to the primary coil, and a pulse duration modulator that controls a switching operation of the switching element, a constant power control circuit, comprising:

a current detector, located in the secondary coil of the transformer, detecting the current flowing to the secondary coil;

a current controller including a first comparator that compares the voltage corresponding to the current detected by the current detector with a predetermined first reference voltage;

a load, electrically coupled to the secondary coil of the transformer to receive the power flowing to the secondary coil;

a voltage controller detecting the voltage at the load, comparing the detected voltage with a second reference voltage, and outputting a difference in voltage between the detected voltage and the second reference voltage;

a constant power controller receiving the current controlled by the current controller and detecting the voltage of the secondary coil, comparing the detected voltage with the first reference voltage, and outputting a difference in voltage between the detected voltage and the first reference voltage;

an amplifier receiving outputs of the voltage detector, the current detector, and the constant power detector, and amplifying the outputs to a predetermined gain value and outputting the result; and a switching controller receiving an output of the amplifier and determining the power of the secondary coil, and controlling the switching duty of the switching element depending on whether the determined power of the secondary coil is above or below the first reference voltage.

2. The circuit of claim 1, wherein the constant power controller comprises (a) a multiplier having (i) a first input terminal coupled to an input terminal of a current detecting resistor and (ii) a second input terminal coupled to an output terminal of the current detector; and (b) a first amplifier having (i) a non-inverting terminal coupled to an output terminal of the multiplier and (ii) an inverting terminal receiving the first reference voltage.

3. The circuit of claim 2, wherein the first reference voltage is a voltage of a maximum power that occurs in the secondary coil of the transformer.

4. The circuit of claim 3, wherein the constant power controller outputs a value only when the voltage input through the non-inverting terminal is over the voltage input through the inverting terminal, that is, the first reference voltage.

5. The circuit of claim 1, wherein the amplifier has a constant power control circuit characterized in a transconductance.

6. The circuit of claim 1, wherein the load is a battery.

7. The circuit of claim 1, wherein the voltage controller comprises an operational amplifier that receives the voltage of the load through a non-inverting input terminal and receives a third reference voltage through an inverting terminal, and outputs a signal of the difference between the two voltages.

8. The circuit of claim 1, wherein the current controller comprises an operational amplifier that receives the output of the current detector through a non-inverting input terminal and receives the second reference voltage through an inverting terminal, and outputs a signal of the difference between the two voltages.

* * * * *